(12) United States Patent
Matreci et al.

(10) Patent No.: US 7,180,937 B2
(45) Date of Patent: Feb. 20, 2007

(54) METHOD FOR DETERMINING IMBALANCE IN A VECTOR SIGNAL MODULATOR

(75) Inventors: Robert J. Matreci, Santa Rosa, CA (US); Eric N. Spotted-Elk, Windsor, CA (US); Peter A. Thysell, Windsor, CA (US)

(73) Assignee: Agilent Technologies, Inc., Santa Clara, CA (US)

( * ) Notice: Subject to any disclaimer, the term of this patent is extended or adjusted under 35 U.S.C. 154(b) by 739 days.

(21) Appl. No.: 10/301,214

(22) Filed: Nov. 20, 2002

(65) Prior Publication Data

US 2004/0095995 A1    May 20, 2004

(51) Int. Cl.
    H04B 3/46    (2006.01)
    H04B 17/00   (2006.01)
    H04B 7/00    (2006.01)
    H04B 1/04    (2006.01)
    H04Q 1/20    (2006.01)

(52) U.S. Cl. .................. 375/224; 455/67.1; 455/67.11; 455/67.13; 455/114.2

(58) Field of Classification Search ................ 375/224, 375/226, 260; 455/63.1, 296, 67.11, 67.13, 455/114.2
    See application file for complete search history.

(56) References Cited

U.S. PATENT DOCUMENTS 6,891,792 B1 *  5/2005  Cimini et al. ............... 370/206
2002/0044597 A1 *  4/2002  Shively et al. .............. 375/222
2003/0231075 A1 * 12/2003  Heiskala et al. ............ 332/103
2003/0231726 A1 * 12/2003  Schuchert et al. .......... 375/350
2004/0178944 A1 *  9/2004  Richardson et al. .......... 342/43

OTHER PUBLICATIONS

Cavers et al. "Adaptive Compensation for Imbalance and Offset Losses in Direct Conversion Transceivers" IEEE transactions on vehicular technology, vol. 42 No. 4, Nov. 1993.*
Tien-Yow Liu, et al.; "A Spectral Correction Algorithm for I-Q Channel Imbalance Problem", date unknown.
Dr. Earl McCune; "Taming the Quadrature Modulator"; Spring 2000; pp. 1-10.

* cited by examiner

Primary Examiner—Khai Tran
Assistant Examiner—Aslan Ettehadieh (57) ABSTRACT

A method of determining imbalance in a vector signal modulator. First and second channels of a vector signal modulator are stimulated with a multi-tone signal having a power versus frequency spectrum having numerous of frequencies. In response to the stimulation, an output of the vector signal modulator is measured. The first and second channels are simultaneously stimulated with a multi-tone signal having essentially the same characteristics as the one used when separately stimulating the channels. Data collected from both the separate and simultaneous stimulations are used to calculate imbalance versus frequency of the vector signal modulator. Alternatively, two channels of a vector signal modulator are simultaneously stimulated with first and second multi-tone signals. The first and second multi-tone signals have tones at main frequencies and at first and second offsets thereto, respectively. Output measurements are then made and imbalances are calculated.

8 Claims, 10 Drawing Sheets

```
BEGIN
   ↓
Stimulate A First Channel Of A Vector Signal Modulator With A
Signal Having A Power Versus Frequency Spectrum Comprising A
Plurality Of Frequencies
610
   ↓
Measure An Output Of The Vector Signal Modulator In Response To
Stimulating The First Channel
620
   ↓
Repeat Steps 610 And 620 For A Second Channel Of The Vector
Signal Modulator
630
   ↓
Calculate A First Imbalance Of The Vector Signal Modulator Versus
Frequency Using Output Measurements From Stimulating The First
And The Second Channel
640
   ↓
END
```

METHOD FOR DETERMINING IMBALANCE IN A VECTOR SIGNAL MODULATOR

TECHNICAL FIELD

Embodiments of the present invention relate to the field of digital communications systems. Specifically, embodiments of the present invention relate to a method of measuring amplitude and phase imbalance in a vector signal modulator.

BACKGROUND ART

Vector modulation or I/Q modulation is a method of modulating a carrier with two baseband signals, referred to as the I (in-phase) and Q (quadrature-phase) components. Use of such modulation allows for an efficient and accurate means of transmitting information on a modulated carrier wave. A typical transmitter may have two baseband sources, one for the I channel and one for Q channel.

Ideally, the I channel and Q channel will have exactly the same gain across all frequencies of interest. Moreover, in quadrature modulation the Q channel should be exactly 90 degrees out of phase with the I channel across all frequencies of interest. However, due to problems such as component mismatches and design flaws, there may be amplitude and phase imbalance between the I and Q channels.

The imbalance can lead to signal contamination that can show up as degradation in the quality of a signal affecting such quality metrics as Error Vector Magnitude (EVM) or Bit Error Rate (BER). Hence, it is desirable to be able to accurately and quickly measure the imbalance. Typically, the measurements are made before the I/Q modulator is sold to a customer. A number of conventional techniques exist for measuring this imbalance. However, all are understood to suffer from one or more of the following deficiencies.

Some I/Q imbalance measurement techniques are not very accurate. For example, the accuracy of some conventional techniques hinges upon the ability to very accurately measure a large difference between an upper and lower sideband signal. Unfortunately, a very small difference in the measured value affects the result significantly. One prior art technique measures at the output of the modulator the amplitude and phase of a constructive signal over a destructive signal, which typically have a very large difference between them. The measuring equipment errors over such a large difference can be significant when expressed as a percentage of the imbalance to be measured.

For example, it may be that the constructive signal is measured to be 100 times the amplitude of the destructive signal. However, when calculating the imbalance of the I/Q modulator, even a small error in the relative magnitudes of the signals greatly affects the imbalance calculation. Hence, the technique is not very accurate.

Some solutions to determine I/Q imbalance are tedious, as they require numerous measurements to be made. For example, some conventional solutions use a single sine wave to measure only one frequency at a time of the signal output by the vector signal modulator that is the device under test (DUT). However, for a typical DUT the imbalance is a function of frequency. Thus, many measurements need to be made to characterize the imbalance over a range of frequencies.

Yet another problem with conventional techniques is a failure to stimulate the DUT with a signal that is representative of a signal used in actual operation of the DUT. Thus, these techniques fail to detect problems such as thermal and compression effects. For example, modern communications signals have considerably different statistics from a sine wave, which is conventionally used to stimulate a DUT. A realistic signal will subject the components of an I/Q modulator to subtle thermal effects. Moreover, the output signal of the I/Q modulator is subject to compression when there are brief peaks in the input signal. Testing the DUT with a conventional constant magnitude sine wave at a single frequency will not cause subtle thermal and compression effects. Failing to detect these effects results in an imbalance measurement that does not reflect the actual imbalance that the DUT will experience under actual use.

Thus, one problem with conventional methods for measuring I/Q imbalance is the lack of accuracy due to, for example, an inherently large error in measurement. Another problem with conventional methods for measuring I/Q imbalance is that too many time consuming and tedious measurements need to be taken. Another problem with conventional methods for measuring I/Q imbalance is that the DUT is not stimulated with realistic signals and hence the imbalance measurements do not accurately reflect DUT problems, such as thermal and compression effects.

DISCLOSURE OF THE INVENTION

The present invention pertains to a method of determining imbalance in a vector signal modulator such as an I/Q modulator. In one embodiment, the method comprises stimulating a first and a second channel of a vector signal modulator with a multi-tone signal having a power versus frequency spectrum comprising a plurality of frequencies. Then, in response to the stimulation, an output of the vector signal modulator is measured at the plurality of frequencies. Next, the collected data is used to calculate an imbalance versus frequency of vector signal modulator. This imbalance may be an amplitude imbalance.

In another embodiment, in addition to the above steps, the first and second channel are simultaneously stimulated with a multi-tone signal having essentially the same characteristics as the one used when separately stimulating the channels. Data is then collected in response to this stimulation. Then, the data from both the separate and simultaneous stimulations are used to calculate a second imbalance versus frequency of the vector signal modulator. This imbalance may be a phase imbalance.

Other embodiments of the present invention substantially correct the measured imbalance in the vector signal modulator by applying an inverse of a function of the imbalance(s) to the vector signal modulator.

In yet another embodiment of the present invention, a first and a second channel of a vector signal modulator are simultaneously stimulated with first and second multi-tone signals, respectively. The first multi-tone signal has a power versus frequency spectrum comprising energy at a plurality of frequencies and at a first offset from the plurality of frequencies. The second multi-tone signal has a power versus frequency spectrum comprising energy at the same plurality of frequencies and at a second offset from the plurality of frequencies. Output measurements are then made and imbalances are calculated. Thus, if the first channel is an I channel and the second channel is a Q channel, the vector signal modulator has its I and Q channels stimulated and measured alone and the I and Q channels stimulated and measured together. These measurements are made near each of the plurality of frequencies.

In performing the above, embodiments of the present invention provide for a method of determining amplitude and phase imbalance in a vector signal modulator. Embodiments quickly and accurately measure an output of the vector signal modulator while stimulating the vector signal modulator in a similar fashion as would actual communication signals that would typically be used in the vector signal modulator.

BRIEF DESCRIPTION OF THE DRAWINGS

The accompanying drawings, which are incorporated in and form a part of this specification, illustrate embodiments of the invention and, together with the description, serve to explain the principles of the invention.

DETAILED DESCRIPTION OF THE INVENTION

In the following detailed description of embodiments of the present invention, a method of determining amplitude and phase imbalance in a vector signal modulator, numerous specific details are set forth in order to provide a thorough understanding of embodiments of the present invention. However, embodiments of the present invention may be practiced without these specific details or by using alternative elements or methods. In other instances well known methods, procedures, components, and circuits have not been described in detail as not to unnecessarily obscure aspects of embodiments of the present invention.

Notation and Nomenclature

Some portions of the detailed descriptions that follow are presented in terms of procedures, logic blocks, processing, and other symbolic representations of operations on data bits within a computer memory. These descriptions and representations are the means used by those skilled in the data processing arts to most effectively convey the substance of their work to others skilled in the art. A procedure, logic block, process, etc., is here, and generally, conceived to be a self-consistent sequence of steps or instructions leading to a desired result. The steps are those requiring physical manipulations of physical quantities. Usually, though not necessarily, these quantities take the form of electrical or magnetic signals capable of being stored, transferred, combined, compared, and otherwise manipulated in a computer system. It has proven convenient at times, principally for reasons of common usage, to refer to these signals as bits, bytes, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussions, it is appreciated that throughout the present invention, discussions utilizing terms such as "stimulating," "storing," "providing," "receiving," "sending," "performing," "calculating," "compensating," "correcting," "measuring," "generating," or the like, refer to the action and processes (e.g., processes 600, 700, 800) of a computer system or similar electronic computing device, that manipulates and transforms data represented as physical (electronic) quantities within the computer system's registers and memories into other data similarly represented as physical quantities within the computer system memories or registers or other such information storage, transmission or display devices.

Various embodiments of the present invention provide a method of determining imbalance in a vector signal modulator, such as an I/Q modulator. Embodiments of the present invention stimulate a vector signal modulator under test with a signal that has a very similar impact on the vector signal modulator as would a signal in actual use.

Embodiments of the present invention require a minimal amount of readings to be collected. Furthermore, embodiments of the present invention cause the vector signal modulator to produce an output signal that may be easily and accurately measured.

Figure 1:
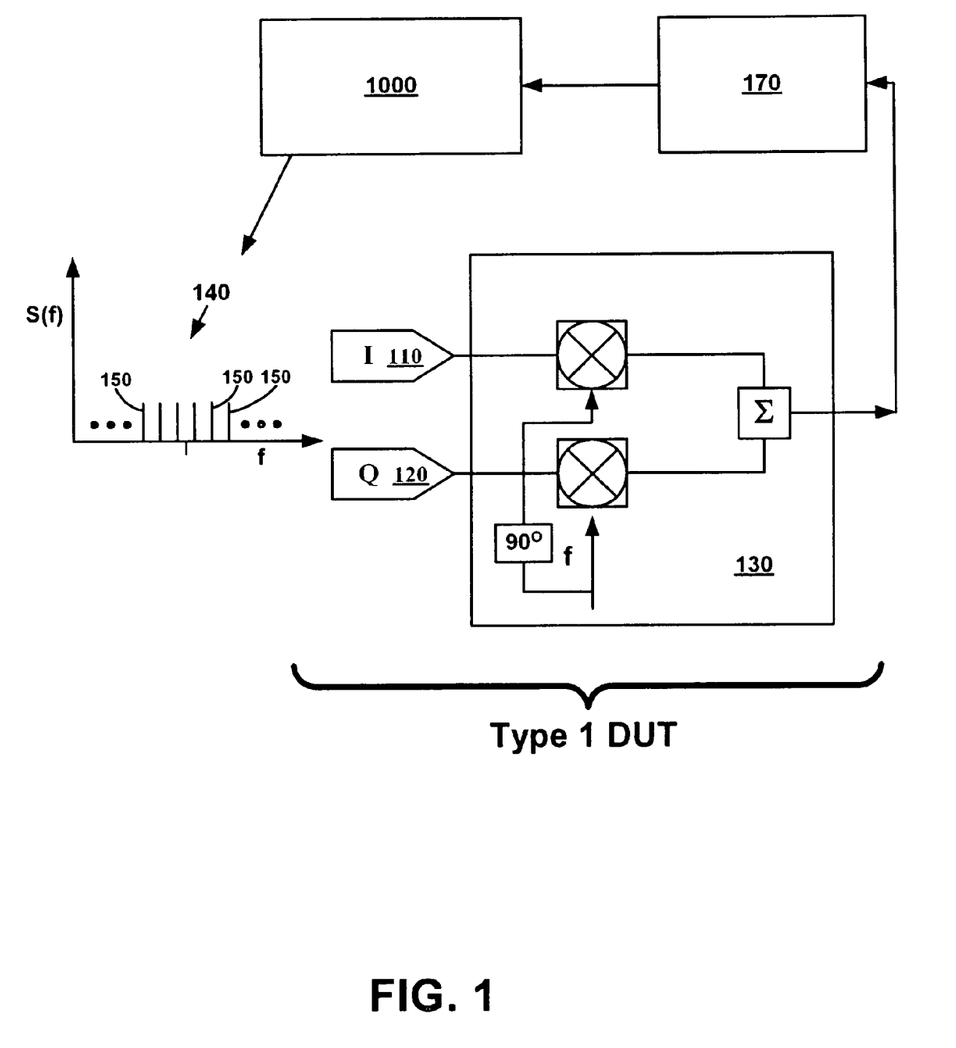
FIG. 1 is a diagram of an exemplary multi-tone test signal being input to a vector signal modulator according to an embodiment of the present invention.

Referring now to FIG. 1, embodiments of the present invention measure I/Q imbalance in a vector signal modulator of the I/Q modulator variety that may be referred to as a type 1 device under test (DUT). The type 1 DUT may comprise an I baseband source 110, a Q baseband source 120, and an I/Q modulator 130. FIG. 1 shows a frequency spectrum of an exemplary test signal 140, which will be described more fully below. The exemplary test signal 140 may be generated by the I baseband source 110 and/or the Q baseband source 120, in some embodiments. In general, the test signal 140 may be multi-tone signal having a power versus frequency spectrum comprising a plurality of frequencies. The amplitude of the tones 150 in the test signal may be substantially equal to one another to facilitate calculating the imbalance, although this is not required. In general, the multi-tone test signal 140 is created with a phase difference between the various tones 150.

The output of the DUT may be input to a conventional spectrum analyzer 170. The spectrum analyzer 170 may be coupled to a computer system 1000, which may analyze the output of the DUT and calculate imbalance, as described herein. The computer system 1000 may also send to the DUT data describing the exemplary test signal 140, such that the DUT may generate the test signal 140 and feed it to the I channel and Q channel to generate suitable data for the computer system 1000 to analyze, as described herein.

The computer system 1000 may also calculate one or more filters to compensate for the imbalance and feed filter data to the DUT for it to implement to substantially correct the imbalance. The computer system 1000 may also calculate a filter that the DUT may implement to substantially compensate for RF frequency response. This may be a complex, cross-product filter that models the absolute frequency response. For example, a 2×2 matrix filter may be used. Throughout this description, the term filter may mean what is used in the DUT for compensation. The compensation may be the inverse of a measured imbalance or frequency response or the like. It will be understood that the computer system 1000 is not required as a separate component.

Figure 2:
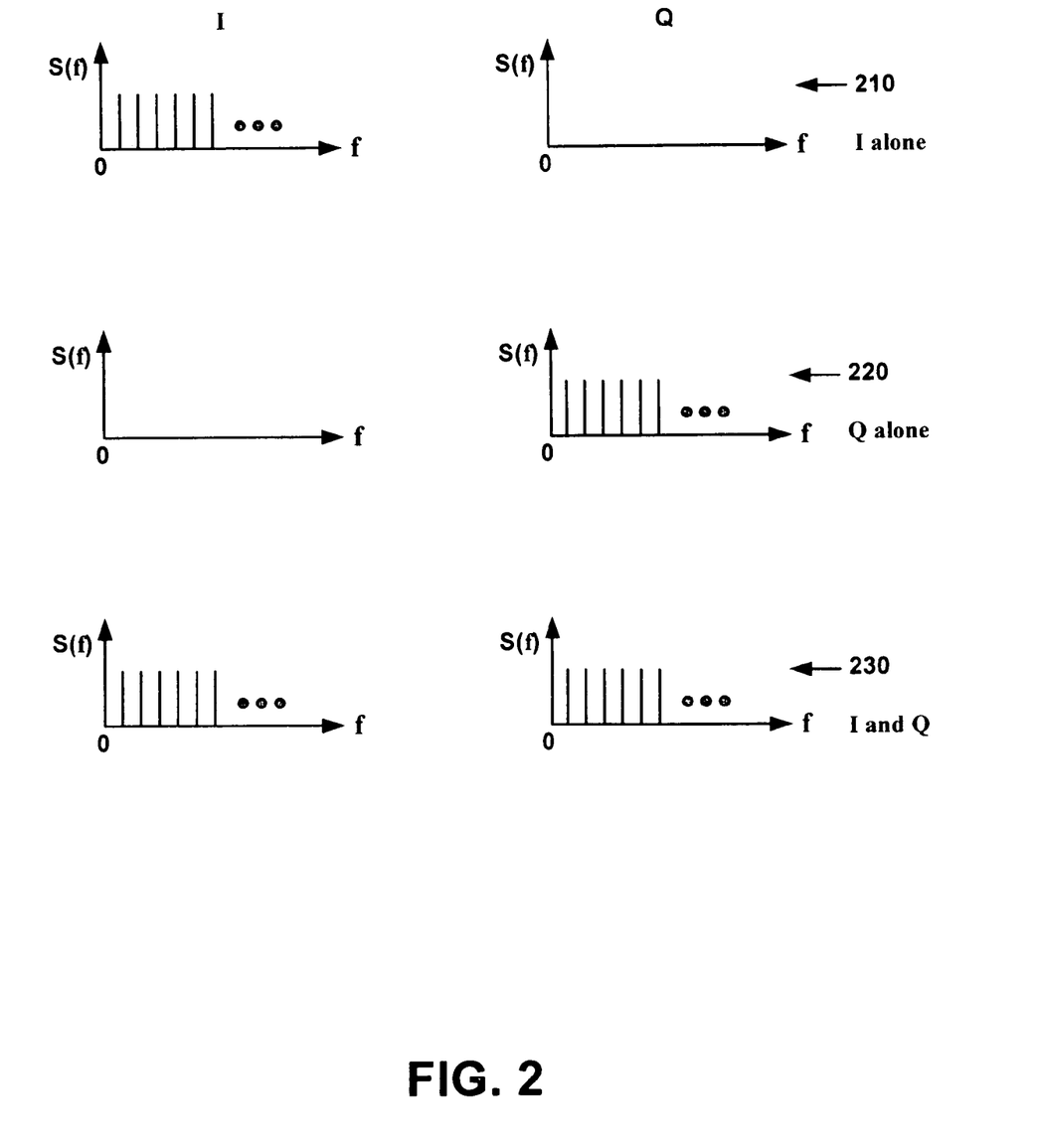
FIG. 2 is an illustration of several exemplary test signals that may be input to one or more channels of a vector signal modulator, according to an embodiment of the present invention.

Referring now to FIG. 2, frequency spectrums for three exemplary test signals are shown. The term signal in the description of FIG. 2 may mean what is to be fed into the I channel and Q channel. The leftmost power spectrums represent what may be fed into an I channel and the rightmost to a Q channel input. In this embodiment, all of the frequency spectrums may be identical to each other. In each case, the signal may be a complex signal comprising multiple tones. The multi-tone signal may comprise hundreds or even thousands of tones, although more or fewer tones may be used. The frequency distribution may be substantially equal spaced. However, in some embodiments the frequency spacing is random. The difference between the three signals may be in what channels are stimulated.

For example, the $I_{alone}$ signal 210 may be suitable to stimulate the I channel while nothing is input to the Q channel. The $Q_{alone}$ signal 220 may be suitable to stimulate the Q channel alone. The I and Q signal 230 may be suitable to stimulate the I and Q channels simultaneously. For the simultaneous case, two identical waveforms may be generated. For example, the I channel baseband source (FIG. 1, 110) and the Q channel baseband source (FIG. 1, 120) may create substantially identical signals. The measurements from the three stimulations may be used to calculate amplitude and phase imbalance. However, amplitude imbalance may be calculated with fewer than all the measurements.

At the output of the I/Q modulator 130 in FIG. 1, three separate measurements may be made by a spectrum analyzer of all the upper and lower sideband frequencies produced by the multi-tone test signal. For example, one measurement measures the result of stimulating the I channel alone, another the Q channel alone, and the third measures the result of stimulating the I and Q channels together.

The test signals in FIG. 2 more closely simulate the actual signal environment of typical digital communications signals than do conventional test signals. The statistics may be described by the Complementary Cumulative Distribution Function (CCDF) of the voltage versus time waveform. The statistics of the multi-tone test signal of embodiments of the present invention may have an approximately Gaussian voltage versus time distribution.

In order to realistically simulate a variety of actual communication signals, the statistics of the multi-tone signal can be adjusted. For example, the relative phases of the multi-tone signals may be adjusted to provide the desired signal statistics to match the intended application of the DUT. The phases may include a parabolic schedule versus baseband frequency, a random schedule, and a constant schedule with a small random component. Other schedules are possible. The parabolic schedule may replicate the single tone statistics of a sine wave. This may be suitable for constant envelope sine wave like digital signals, such as Minimum Shift Keying. The random phase schedule may simulate a variety of digital communication signal CCDF's, depending on the random seed and phase relationship. The CCDF can range from slightly higher CCDF than sine waves, through the Gaussian CCDF of additive white Gaussian noise (AWGN), to greater than AWGN CCDF that may be suitable for CDMA (Code Division Multiple Access).

Advantageously, embodiments of the present invention randomize the frequencies in the multi-tone test signal so that the distortions products have much less probability of falling on the desired test frequencies. For example, while the multi-tone test signal may be constructed with the various tones equally spaced, this is not required. In one embodiment, the frequencies of the tones are randomly spaced. This random spacing distributes the distortion products randomly so far fewer distortion products fall on the location of the multi-tone signals versus a uniformly spaced signal. For example, in an evenly spaced multi-tone signal, the tones may be at integer multiples of frequency $f_a$. In this case, there may be many intermodulation distortion products. For example, the tones at $3f_a$ and $5f_a$ may intermodulate to cause distortion at $8f_a$. Moreover, many other tones may create intermodulation distortion at $8f_a$. Randomly spacing the tones in the multi-tone test signal may spread the distortion out.

Advantageously, the output signal of the vector signal modulator may contain information for imbalance over a wide range of frequencies. Embodiments create an output signal that covers the entire range of frequency of interest for a given DUT by appropriate selection of a test signal. Moreover, the distribution of the frequencies in the output signal may result from a pattern selected for the test signal such that the DUT is stimulated to test it comprehensively and realistically.

Figure 3:
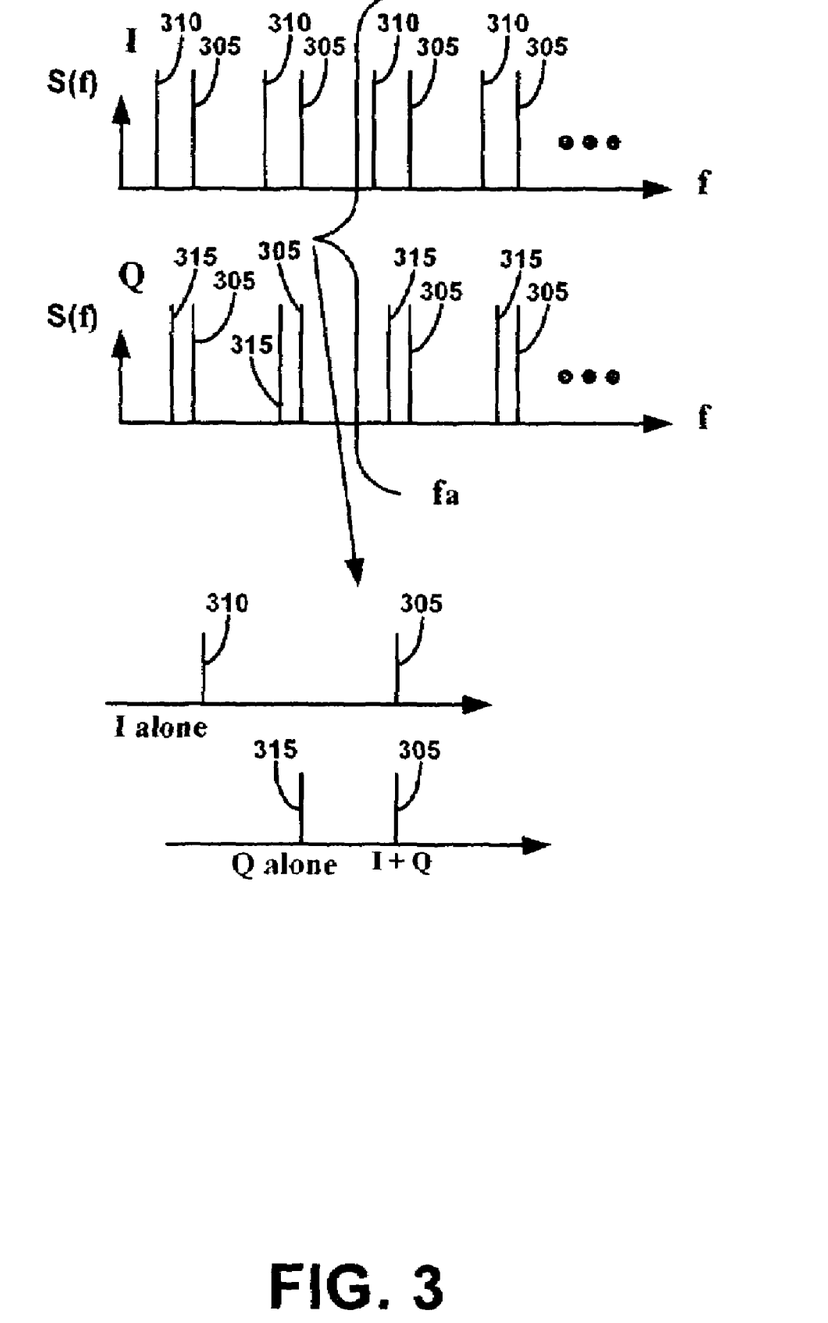
FIG. 3 is a diagram illustrating exemplary test signals that may be simultaneously input to a device under test, according to embodiments of the present invention.

Referring now to FIG. 3, some embodiments use frequency triples as test signals. In these embodiments, the signal that is fed into the I channel may differ slightly from that of the signal fed into the Q channel. This embodiment may be referred to as a frequency triple because near each of a plurality of frequencies, for example, "$f_a$" in FIG. 3, there is a first component "I alone", a second component "Q alone", and a third component "I and Q". The three components are separated by a slight frequency offset, such that the output signal of the DUT may be spectrally analyzed to recover the effects near frequency $f_a$ of stimulating channel I alone, channel Q alone, and channel I and Q together. The frequency triple test signal may comprise such a triple near each of the frequencies of interest.

Still referring to FIG. 3, the signal whose power spectral density is labeled "I" comprises two of the three components. In a similar fashion, the signal whose power spectral density is labeled "Q" also has two of the three components. Thus, the I signal has a power versus frequency spectrum comprising energy at a plurality of frequencies 305 and at a first offset 310 from those plurality of frequencies 305. As the magnified portion of FIG. 3 shows, the first offset 310 may also be referred to as "I alone". The Q signal has a power versus frequency spectrum comprising energy at the plurality of frequencies 305 and at a second offset 315 from the plurality of frequencies. As the magnified portion of FIG. 3 shows, the second offset 315 may also be referred to as "Q alone". The offsets may be on the order of tenths of a Hertz, although embodiments of the present invention are not so limited.

For the case of the frequency triples, a conventional spectrum analyzer may be used to measure the output of the DUT to determine the effect of each of the three components of the multi-tone signal. For example, a conventional spectrum analyzer may distinguish between the frequencies corresponding to the I signal alone 310, Q signal alone 315, and the I+Q signal together 305.

Figure 4:
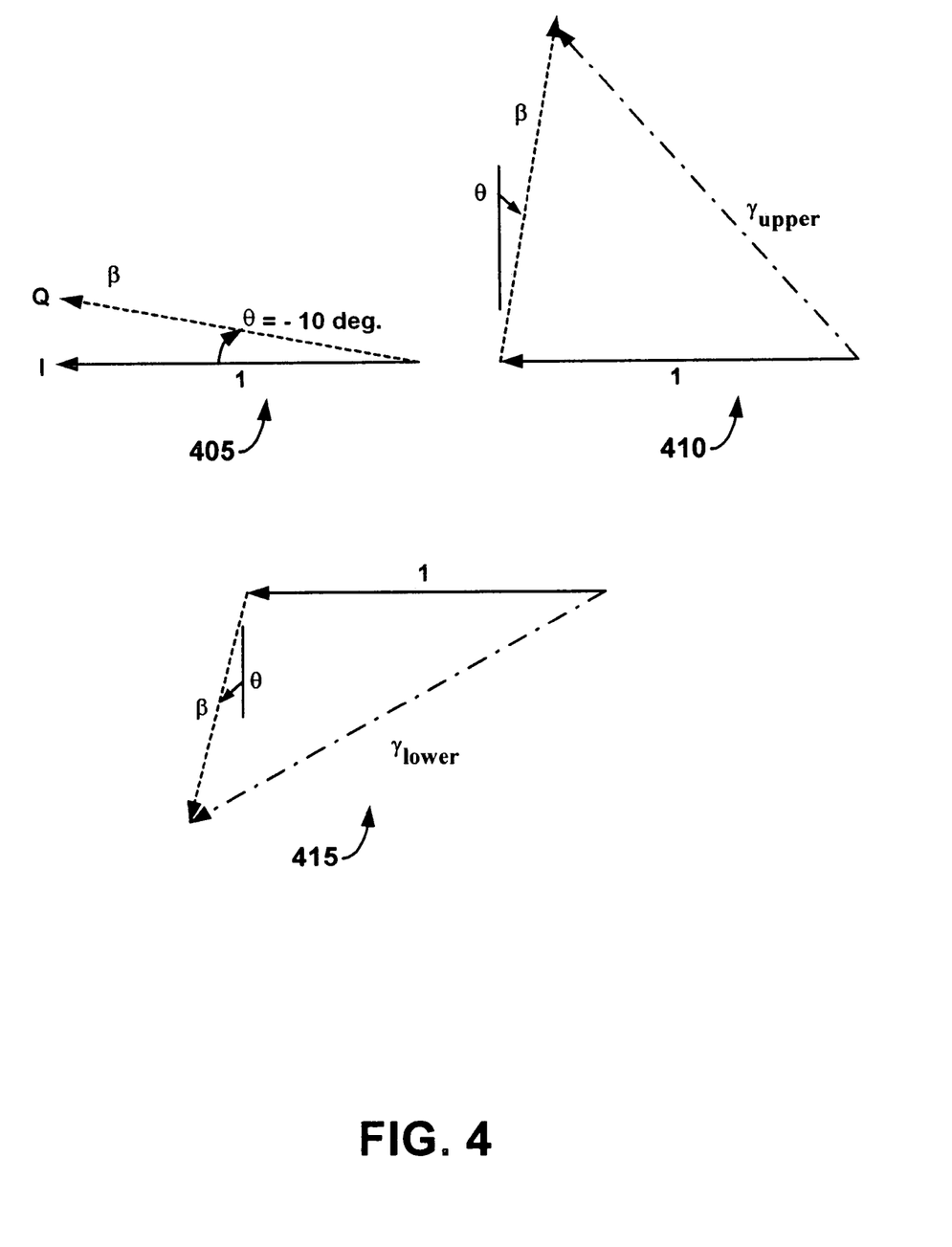
FIG. 4 is a diagram illustrating calculating amplitude and phase imbalance in a vector signal modulator.

The data from the measurement may be combined by mathematical algorithms shown in FIG. 4 to yield an imbalance versus frequency of the I and Q channels of the DUT. The same equations may be used whether the test signal is the exemplary format of FIG. 2 or FIG. 3. Referring now to FIG. 4, several diagrams are illustrated to facilitate explanation of the imbalance calculation process. The vectors labeled 405 may illustrate a hypothetical amplitude and phase imbalance relationship between an I vector and a Q vector. For convenience, the I vector is represented as a unit vector. The phase imbalance (θ) is arbitrarily shown as −10 degrees. The group of vectors labeled 410 and 415 may represent a relationship at the output of the DUT between the I vector, Q vector, and γ vectors. The γ vectors may be measured as upper and lower sidebands of the spectrum that is output by the DUT in response to stimulation by the multi-tone signal.

Still referring to FIG. 4, if there were no phase imbalance, the vectors labeled "1" and "β" would be at right angles in the vector groups 410 and 415. In this example, there is a −10 degrees phase imbalance. Using the relationships as shown in FIG. 4, the following equations may be used to calculate an amplitude imbalance (β) and a phase imbalance (θ).

$$\beta^2 = I_{alone}/Q_{alone} \qquad \text{Equation 1:}$$

$$\gamma^2 = (I \text{ and } Q)/I_{alone} \qquad \text{Equation 2:}$$

$$\gamma^2 = 1 + \beta^2 - 2\beta(\sin(\theta)) \qquad \text{Equation 3:}$$

$$\theta = \sin^{-1}(1 - \gamma^2 + \beta^2)/2\beta \qquad \text{Equation 4:}$$

Now that testing for imbalance in a type 1 DUT has been described according to various embodiments, testing a type 2 DUT will be described according to other embodiments of the present invention. Advantageously, many of the techniques for testing type 1 DUTs may be applied to type 2 DUTs.

Figure 5:
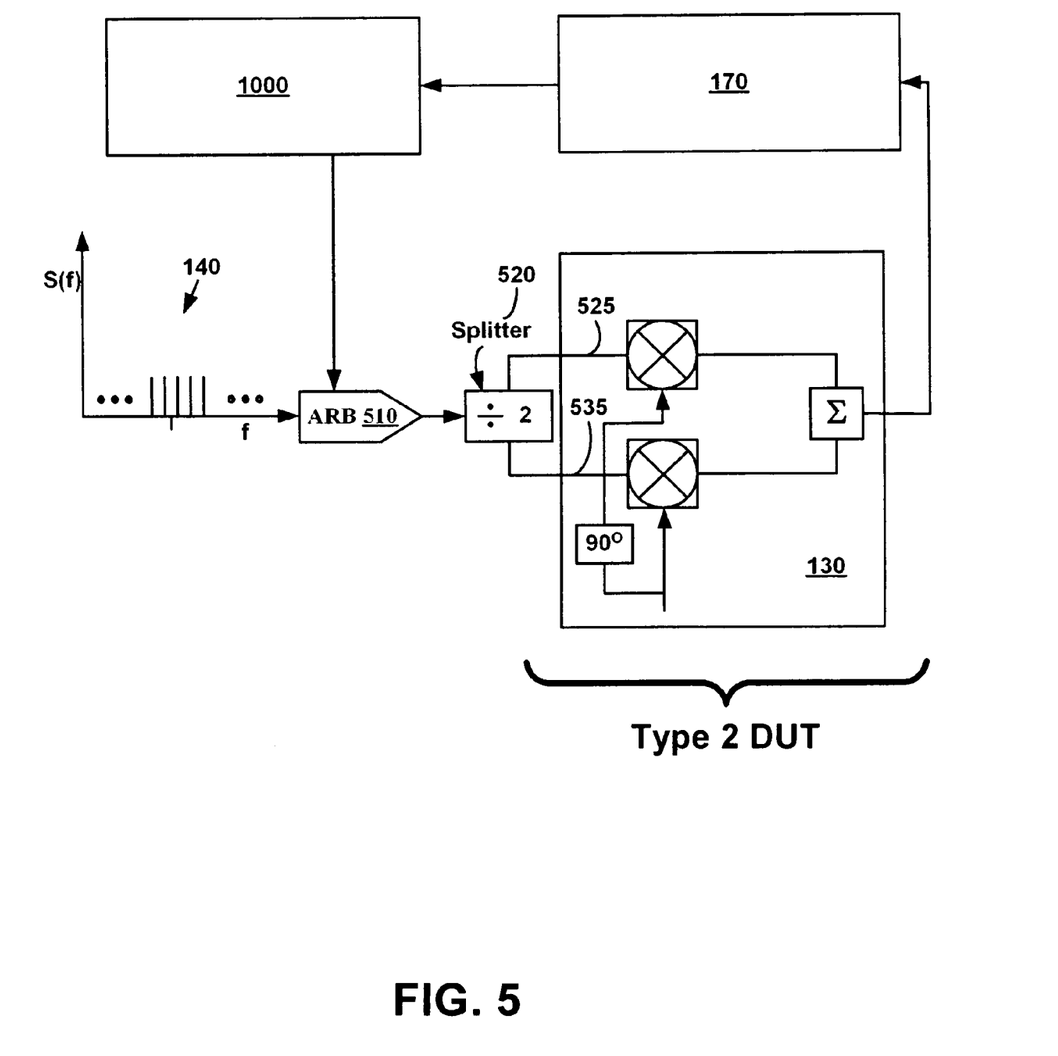
FIG. 5 is an exemplary multi-tone test signal being input to a type 2 vector signal modulator according to an embodiment of the present invention.

Referring now to FIG. 5 for the type 2 DUT, the I/Q modulator 130 alone may be tested. The multi-tone test signal 140 may be generated by an external arbitrary waveform generator (ARB) 510 connected to the I/Q modulator 130 by means of a matched power splitter 520. Instead of identical waveform files being generated by the Type 1 DUT's baseband I/Q sources, for the Type 2 DUTs identical analog waveform signals are provided to the I port 525 and/or Q port 535 of the DUT from the close matching of the power splitter. For example, the $I_{alone}$ 210, $Q_{alone}$ 220, and I and Q 230 signals shown in FIG. 2 may be input, for example. Splitters such as those constructed with thin-film techniques to form transmission lines and resistors are suitably matched in their output amplitude and phase responses over the baseband frequencies involved.

The output of the type 2 DUT may be input to a conventional spectrum analyzer 170. The spectrum analyzer 170 may be coupled to a computer system 1000, which may analyze the output of the DUT and calculate imbalance, as described herein. The computer system 1000 may also send data to the ARB 510 describing the exemplary test signal 140 such that the ARB 510 may generate the test signal 140 and feed it to the I channel and Q channel to generate suitable data for the computer system 1000 to analyze, as described herein.

The computer system 1000 may also calculate one or more filters to compensate for the imbalance and send filter data to the DUT for it to implement to substantially correct the imbalance. The computer may also calculate a filter that the DUT may implement to substantially compensate for the RF frequency response. This may be a complex, cross-product filter that models the absolute frequency response. For example, a 2×2 matrix filter may be used. It will be understood that the computer system 1000 is not required as a separate component.

In some embodiments, additional measurements can be made to further refine the previous measurement to account for the imperfection of the power splitter 520. First, the splitter 520 connections are reversed and new measurements are taken. Results that are common mode may be due to the I/Q modulator 130. The change in the results may be due to the splitter 520.

Figure 6:
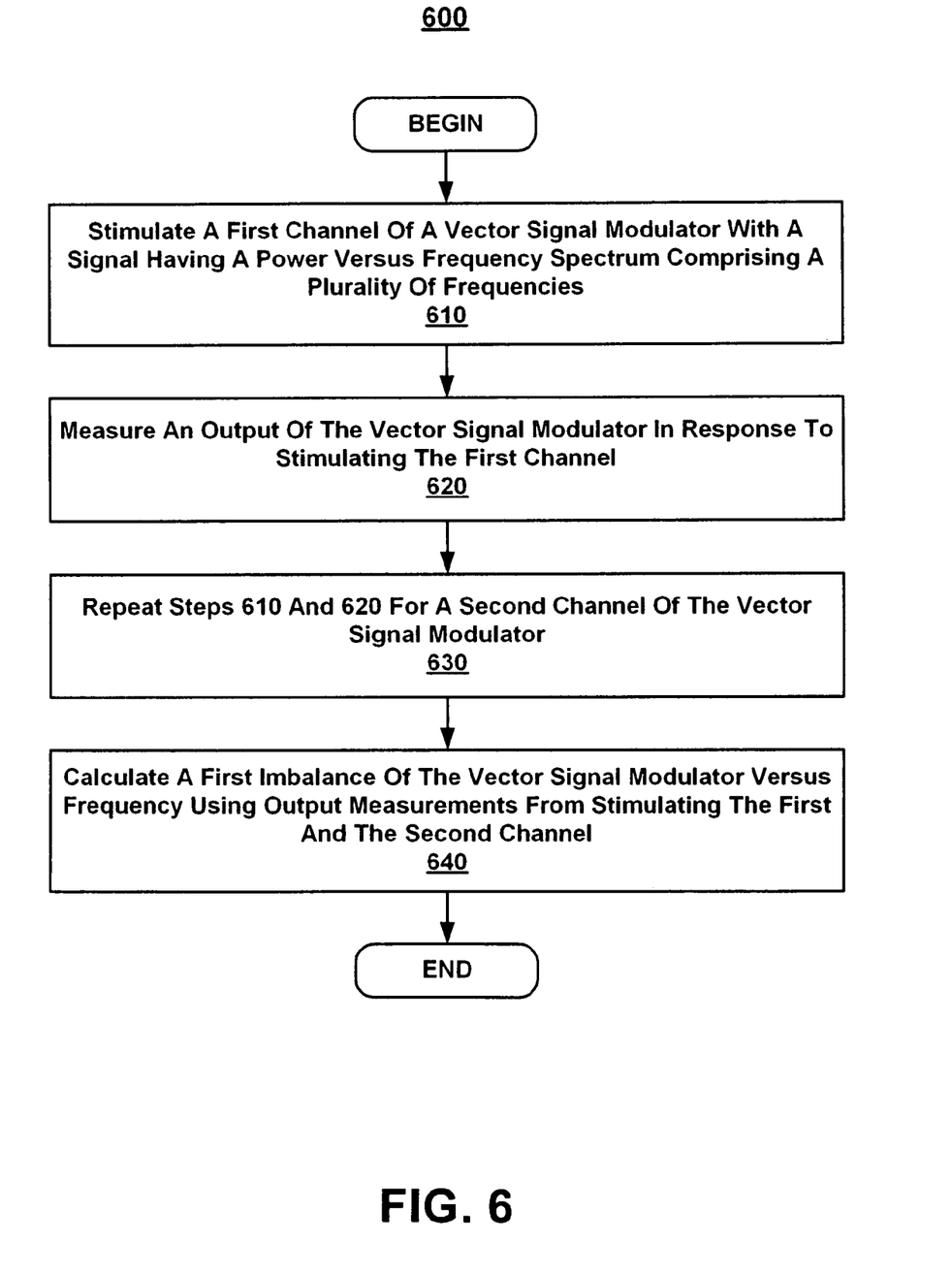
FIG. 6 is a flowchart illustrating steps of a process of measuring vector signal modulator imbalance, according to an embodiment of the present invention.

FIG. 6 illustrates steps of a process 600 of determining imbalance in a vector signal modulator, according to an embodiment of the present invention. Step 610 comprises stimulating a first channel of a vector signal modulator with a multi-tone signal having a power versus frequency spectrum comprising a plurality of frequencies. A signal such as the I alone or Q alone signal shown in FIG. 2 may be used, although embodiments of the present invention are not so limited.

Step 620 comprises measuring, at the plurality of frequencies, an output of the vector signal modulator in response to stimulating the first channel. A conventional spectrum analyzer may used.

Step 630 comprises repeating steps 610 and 620 for a second channel of the vector signal modulator. A signal that is substantially the same as the one used for the first channel may be used.

Step 640 comprises calculating a first imbalance of the vector signal modulator versus frequency using output measurements from stimulating the first and the second channel. For example, equation 1 may be used to determine an amplitude imbalance.

Figure 7:
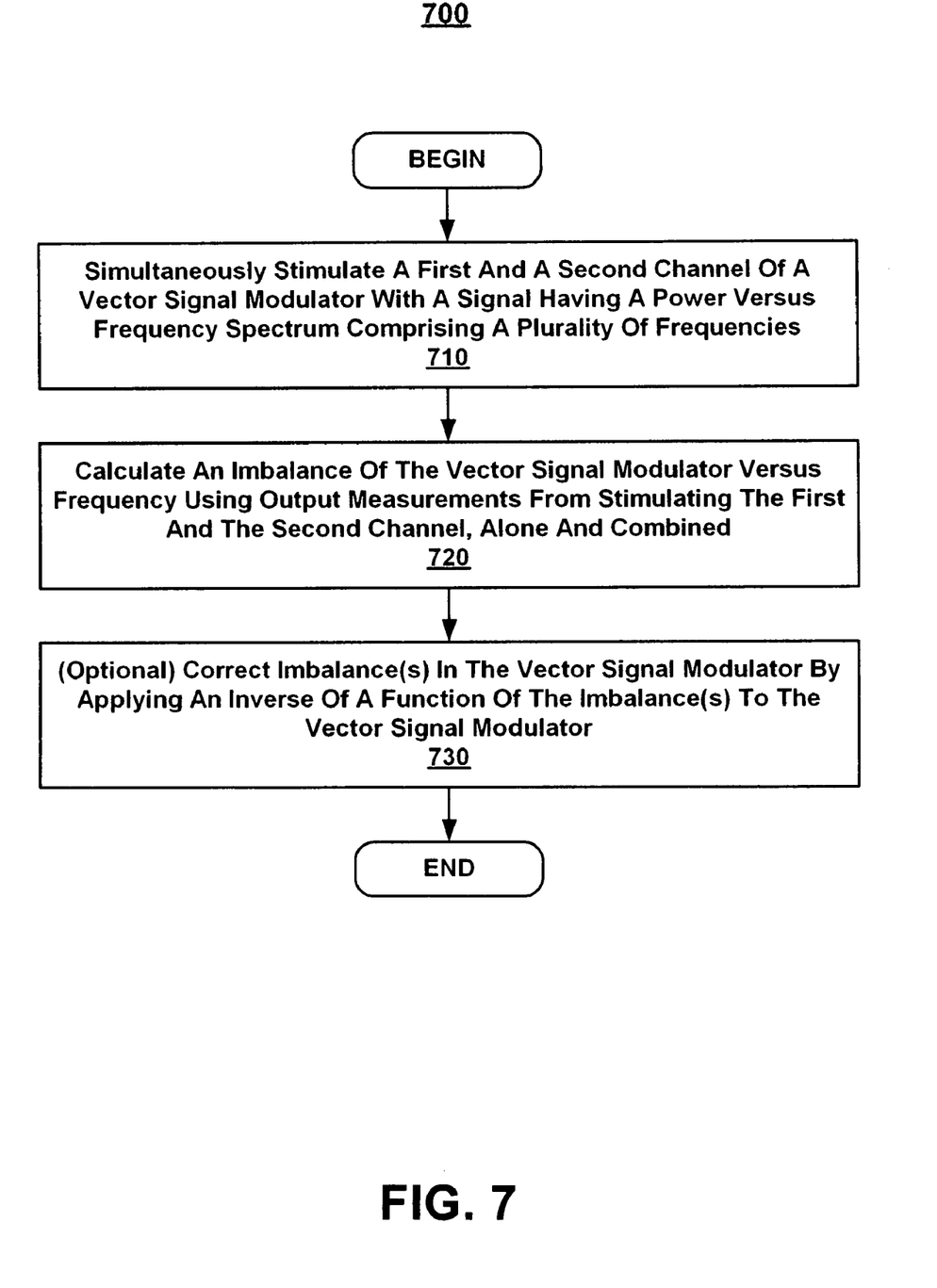
FIG. 7 is a flowchart illustrating steps of a process of measuring vector signal modulator imbalance, according to an embodiment of the present invention.

FIG. 7 illustrates steps of a process of determining imbalance in a vector signal modulator, according to an embodiment of the present invention. Steps of process 700 may be performed together with steps of process 600 of FIG. 6, although either process may be performed first.

In step 710, a first and a second channel are simultaneously stimulated with a multi-tone signal having a power versus frequency spectrum comprising a plurality of frequencies. The multi-tone signal may be an essentially identical copy of the signal used in steps 610 and 630 of process 600 of FIG. 6. For example, a signal such as the I and Q signal of FIG. 2 may be used, although embodiments of the present invention are not so limited. The multi-tone signals may be generated by I and Q baseband sources or by splitting the signal of an arbitrary waveform generator, in various embodiments.

Step 720 comprises measuring, at the plurality of frequencies, an output of the vector signal modulator in response to the stimulating the first and second channels simultaneously.

Step 730 comprises calculating a phase imbalance of the vector signal modulator versus frequency. The calculation may use output measurements from stimulating the first and the second channel alone and combined. Equation 4 may be used to calculate the phase imbalance, although embodiments of the present invention are not so limited.

Step 740 is an optional step of correcting imbalance(s) in the device under test by applying to the device under test an inverse of a function of the imbalance(s). For example, digital signal processing may be performed within the DUT.

The steps prior to step 740 may be performed before the DUT is provided to the customer, although embodiments of the present invention are not so limited. However, the signal correction in step 740 may be performed while the DUT is in actual use. Alternatively, the imbalance in the DUT may be corrected by supplying the results to a DUT designer who may redesign the layout of the DUT or select components with greater accuracy. Various embodiments may compensate for the amplitude imbalance, the phase imbalance, or both. As the imbalance(s) may be a function of frequency, the correction may target selected frequencies. Additional embodiments provide for an RF frequency response filter, such as, for example, a complex filter with cross terms as discussed herein.

Figure 8:
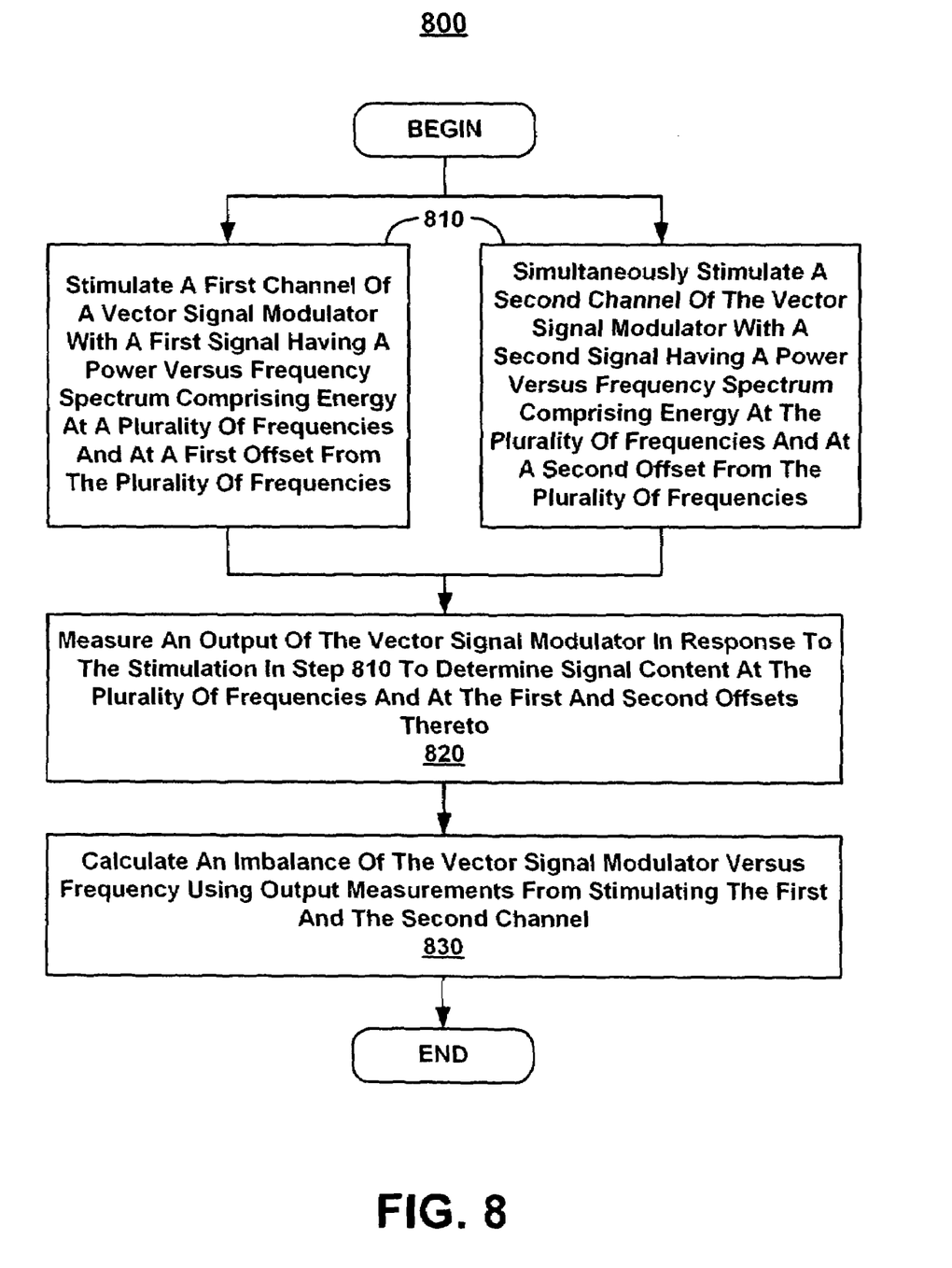
FIG. 8 is a flowchart illustrating steps of a process of measuring vector signal modulator imbalance, according to an embodiment of the present invention.

FIG. 8 illustrates steps of a process 800 of determining imbalances in a vector signal modulator by simultaneously stimulating the I and Q channels with a slightly different signal. In step 810, the I and Q channels are simultaneously stimulated with first and second multi-tone signals, respectively. The first multi-tone signal may have a power versus frequency spectrum comprising energy at a plurality of frequencies and at a first offset from the plurality of frequencies. The second multi-tone signal may have a power versus frequency spectrum comprising energy at the plurality of frequencies and at a first offset from the plurality of frequencies. Exemplary suitable signals are illustrated in FIG. 3 as the signals with frequency spectrums labeled "I" and "Q".

Step 820 comprises measuring an output of the vector signal modulator in response to the simultaneous stimulation in step 810 to produce readings at the plurality of frequencies and at the first and second offsets thereto.

Step 830 comprises calculating an imbalance of the vector signal modulator versus frequency using output measurements from stimulating the first and the second channel. Equations 1 and 4 may be used in this step, although embodiments of the present invention are not so limited.

Figure 9:
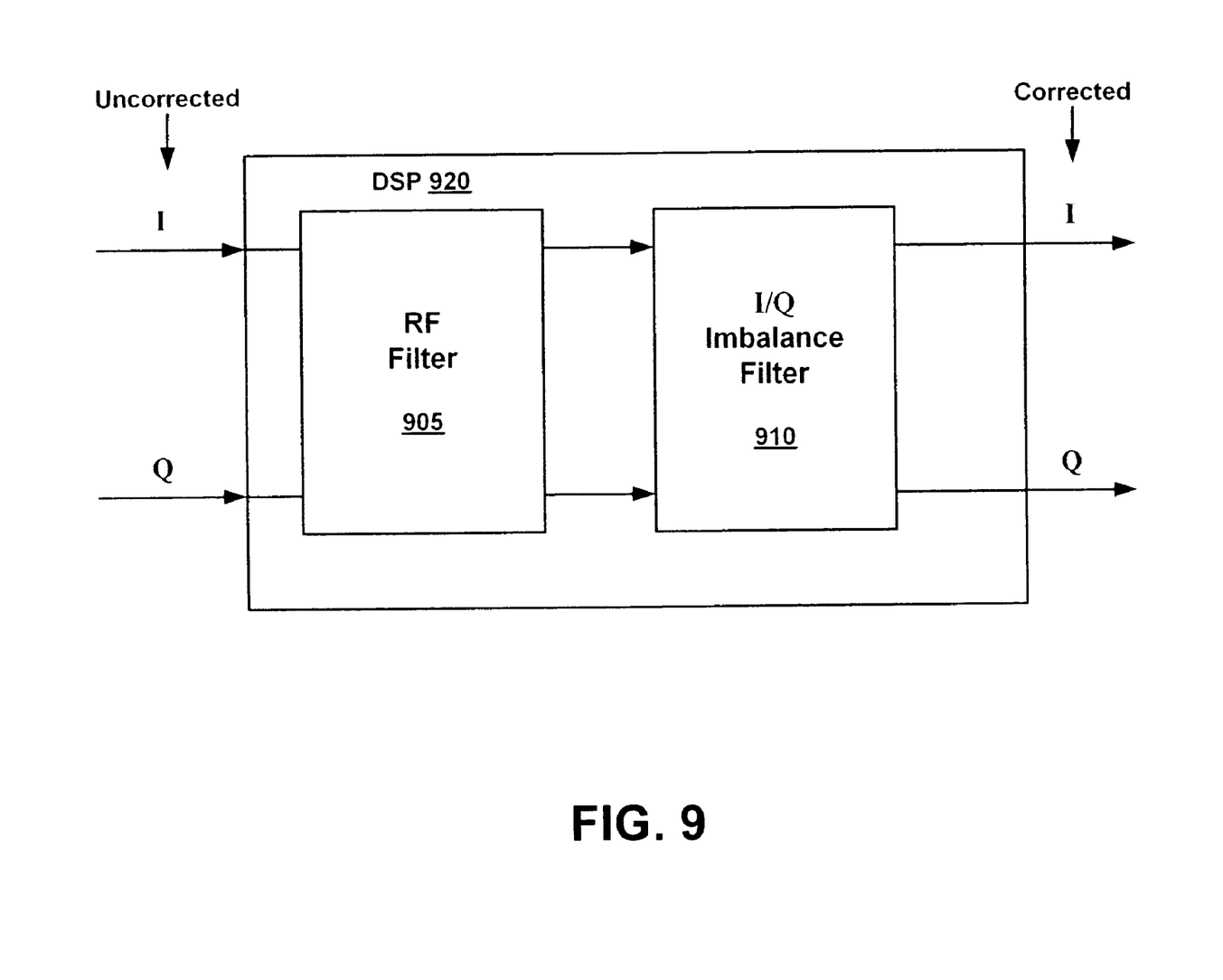
FIG. 9 is a diagram illustrating filters for compensating I/Q imbalance and RF frequency response, according to an embodiment of the present invention.

FIG. 9 illustrates exemplary filters and their application. The RF filter 905 and I/Q filter 910 may be implemented within DSP software 920 within the vector signal modulator. However, hardware could be used instead. Those of ordinary skill in the art will understand that the RF filter 905 and I/Q filter 910 may be implemented by a single filter.

The RF filter may be the inverse of a function that describes the RF frequency response of the DUT in response to stimulation with the multi-tone test signal. The I/Q filter may be the inverse of a function that describes the imbalance of the DUT in response to stimulation with the multi-tone test signal. Both filters may be complex filters.

Uncorrected I and Q signals are processed by the RF filter 905 and I/Q filter 910. The corrected I and Q signals may be fed into the I baseband source and Q baseband source, respectively (FIG. 1, 110 and 120). In this fashion, correction or compensation is provided for in the vector signal modulator.

Figure 10:
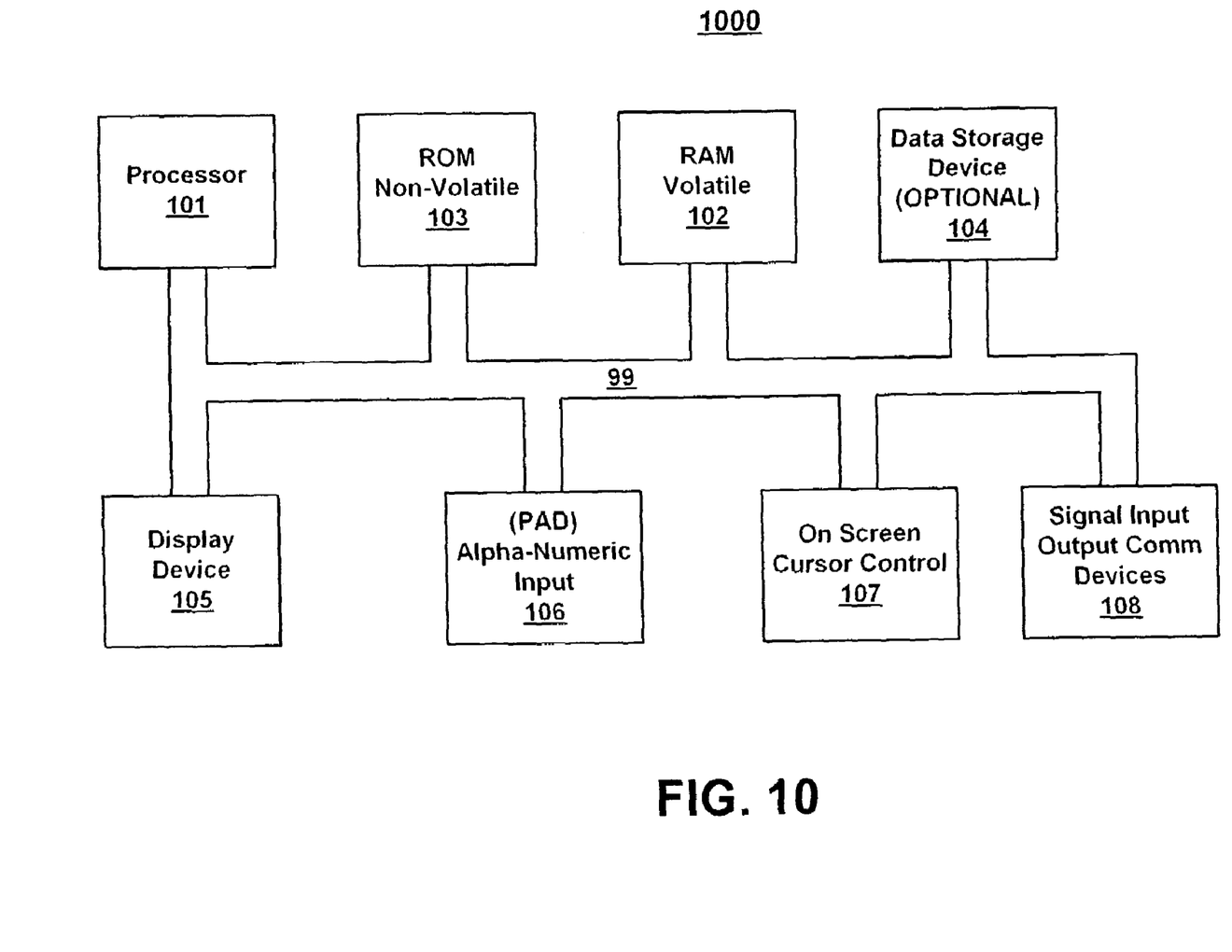
FIG. 10 is an exemplary computer system that may serve as a platform for embodiments of the present invention.

With reference now to FIG. 10, portions of embodiments of the present invention may comprise computer-readable and computer-executable instructions that reside, for example, in computer-usable media of a computer system. FIG. 10 illustrates an exemplary computer system 1000 used to perform a method in accordance with embodiments of the present invention. It is appreciated that system 1000 of FIG. 10 is exemplary only in that the present invention can operate within a number of different computer systems including general purpose networked computer systems, embedded computer systems, and stand alone computer systems. Additionally, computer system 1000 of FIG. 10 is well adapted to having computer readable media such as, for example, a floppy disk, a compact disc, and the like coupled thereto. Such computer readable media is not shown coupled to computer system 1000 in FIG. 10 for purposes of clarity.

Computer system 1000 of FIG. 10 includes an address/data bus 99 for communicating information, and a central processor unit 101 coupled to bus 99 for processing information and instructions. Central processor unit 101 may be an 80×86-family microprocessor. System 1000 also includes data storage features such as a computer usable volatile memory 102, e.g. random access memory (RAM), coupled to bus 99 for storing information and instructions for central processor unit 101, computer usable non-volatile memory 103, e.g. read only memory (ROM), coupled to bus 99 for storing static information and instructions for the central processor unit 101, and an optional data storage unit 104 (e.g., a magnetic or optical disk and disk drive) coupled to bus 99 for storing information and instructions.

With reference still to FIG. 10, system 1000 also includes an optional alphanumeric input device 106 including alphanumeric and function keys is coupled to bus 99 for communicating information and command selections to central processor unit 101. System 1000 also optionally includes a cursor control device 107 coupled to bus 99 for communicating user input information and command selections to central processor unit 101. System 1000 also includes an optional display device 105 coupled to bus 99 for displaying information. A signal input/output communication device 108 coupled to bus 99 provides communication with external devices. For example, system 1000 may receive data from a spectrum analyzer or send data to an arbitrary waveform generator or vector signal modulator.

Thus, embodiments of the present invention provide for a method of determining amplitude and phase imbalance in a vector signal modulator. Embodiments quickly and accurately measure an output of the vector signal modulator while stimulating the vector signal modulator in a similar fashion as would actual communication signals that would typically be used in the vector signal modulator.

While the present invention has been described in particular embodiments, it should be appreciated that the present invention should not be construed as limited by such embodiments, but rather construed according to the below claims.

We claim:

1. A method of determining imbalance in an I/Q modulator, comprising:
    a) separately stimulating an I channel and a Q channel of said I/Q modulator with first multi-tone signals that are substantially identical, said first multi-tone signal having tones at a plurality of frequencies and having an approximately Gaussian voltage versus time distribution;
    b) measuring, for said separate I channel and Q channel stimulation, an output of said I/Q modulator;
    c) simultaneously stimulating said I channel and said Q channel of said I/Q modulator with second signals that are substantially identical to said first signals;
    d) measuring an output of said I/Q modulator in response to said stimulation in said c); and
    e) calculating an imbalance of said I/Q modulator versus frequency using said output measurements from said b) and said d).

2. A method as in claim 1, further comprising:
generating said first multi-tone signals by splitting, with a matched power splitter, a signal from an external arbitrary waveform generator.

3. A method as in claim 1, further comprising:
generating said first multi-tone signals from an I baseband source and a Q baseband source of said I/Q modulator.

4. A method as in claim 1, further comprising:
f) applying an inverse of said imbalance to said I/Q modulator to substantially compensate for said imbalance.

5. A method as in claim 1, wherein said tones in said multi-tone signal comprise approximately tens of tones.

6. A method as in claim 1, wherein said tones in said multi-tone signal comprise approximately hundreds of tones.

7. A method as in claim 1, wherein a frequency distribution of said first multi-tone signals are random.

8. A method as in claim 1, wherein a frequency distribution of said first multi-tone signals are essentially equal spaced.

* * * * *